United States Patent [19]

Wedlake et al.

[11] Patent Number: 4,975,344
[45] Date of Patent: Dec. 4, 1990

[54] ELECTROCHEMICAL CELL

[75] Inventors: Roger J. Wedlake, Johannesburg; Johan Coetzer, Pretoria, both of South Africa

[73] Assignee: Lilliwyte Societe Anonyme, Luxembourg

[21] Appl. No.: 445,470

[22] Filed: Dec. 1, 1989

[51] Int. Cl.$^5$ .......................................... H01M 10/39
[52] U.S. Cl. ..................................... 429/103; 429/199
[58] Field of Search ............... 429/102, 103, 101, 191, 429/199, 66

[56] References Cited

U.S. PATENT DOCUMENTS

| | | | |
|---|---|---|---|
| 3,663,295 | 5/1972 | Baker | 429/102 |
| 4,237,200 | 12/1980 | Weddigen | 429/102 |
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,592,969 | 6/1986 | Coetzer et al. | 429/50 |
| 4,626,483 | 12/1986 | Bones et al. | 429/50 |
| 4,722,875 | 2/1988 | Wright | 429/103 |
| 4,772,449 | 9/1988 | Bones et al. | 419/2 |
| 4,797,332 | 1/1989 | Barrow et al. | 429/104 |
| 4,797,333 | 1/1989 | Coetzer | 429/103 |
| 4,800,143 | 1/1989 | Harbach et al. | 429/153 |

FOREIGN PATENT DOCUMENTS 1344069  1/1974  United Kingdom .
2193837A 2/1988  United Kingdom .

OTHER PUBLICATIONS

Article—"Investigation of High Temperature Battery Systems", Seo et al., TRW Systems Group for Army Electronics Command, Jan. 1974.
Interim report—"Development Program for Solid Electrolyte Batteries", Silverman et al., TRW Defense and Space Systems Group for Electric Power Research Institute (Jul. 1, 1974 to Jun. 30, 1975).
Final Report—"Development Program for Solid ELectrolyte Batteries", Silverman et al., TRW Defense and Space Systems Group for Electric Power Research Institute (Sep. 1976).
Article—"The Sulphur Electrode Performance in Sodium/Sulfur Cells", Piercy and Sudworth, British Railways Board, Research and Development Div.
Article—"An Analysis and Laboratory Assessment of Two Sodium Sulphur Cell Designs", Sudworth et al., British Railways Research Department.
Article—"The Function and Performance of Beta Alumina in Sodium/Sulphur Cells", Hames and Duncan, British Railways Board, Society of Automotive Engineers, Inc. (Feb. 24-28, 1975).
Extract, "Sodium/Sulphur Battery Development in the United Kingdom", Dell et al., 11th IECEC, 503.
Extract, "The Sodium Sulfur Battery", J. L. Sudworth and A. R. Tilley, Chapman and Hall, New York, 1985, 132-3.

Primary Examiner—Anthony Skapars
Attorney, Agent, or Firm—Arnold, White & Durkee

[57] ABSTRACT

The invention provides a high temperature rechargeable electrochemical power storage cell having an alkali metal anode molten at the cell operating temperatrure. A solid electrolyte separator conductive of ions of the anode separates the anode from a cathode having an electronically conductive electrolyte-permeable porous matrix impregnated with liquid electrolyte comprising cations of the anode metal and halide ions. Dispersed in the porous interior of the matrix is an electronically active cathode substance substantially insoluble in the liquid electrolyte. The separator is a sheet and the matrix of the cathode has the same peripheral outline as the sheet. The matrix is opposed to the sheet and is in register face-to-face therewith. The separator and sheet are located in a cell housing divided by the separator into an anode compartment containing the anode and a cathode compartment containing the cathode.

2 Claims, 4 Drawing Sheets

ELECTROCHEMICAL CELL

This invention relates to electrochemical power storage cells. More particularly, the invention relates to an electrochemical power storage cell which is rechargeable and which has a molten alkali metal anode [negative electrode] separated by a separator from a cathode which comprises an electronically conductive electrolyte-permeable porous matrix which is impregnated with a liquid electrolyte and which has electrochemically active cathode [positive electrode] material dispersed therein.

The Applicant is aware of cells of the type described above, in which the separator is tubular in shape, having the cathode inside the tube and the anode outside the tube, or vice versa. When the cathode is outside the separator it is generally also tubular in shape, and when it is inside the separator it may be tubular or cylindrical. Typically, in such cells, the maximum capacity is determined by the size of the sealed hollow interior of the separator tube, which defines the maximum size of the electrode [cathode or anode as the case may be] located in its interior. For efficiency as regards volumetric energy density, which is related to the parameter $[Ah/m^3]$, and indeed mass energy density, which is related to the parameter $[Ah/kg]$, the interior space of the separator must be completely filled by the electrode occupying it, so that such cells are typically designed to have the separator tube completely filled by one of the electrodes, the other electrode, outside the separator tube, being designed to have a matching capacity. The cell thus has, for a particular cathode material and anode material, a single value for its capacity, and hence a single value for the parameter capacity/unit area separator surface, at which there is maximum volumetric energy density and maximum mass energy density.

Such cells, designed to have their separator tubes completely filled by one of the electrodes, thus suffer from substantial inflexibility as regards varying, for a fixed diameter of separator tube, the value of capacity/unit area of separator surface. This value cannot be increased, as the electrode in the separator tube cannot be enlarged, and the value of capacity/unit area of the separator surface can only be reduced inefficiently. While it is straightforward efficiently to reduce the capacity of the electrode outside the separator tube by reducing its radial thickness or volume, a corresponding reduction in capacity of the electrode inside the separator tube causes problems. Either the separator tube will be incompletely filled, leading to a volumetric energy density penalty, or it will contain electrode material which cannot be discharged and is dead weight, leading to both mass energy density and volumetric energy density penalties.

It follows thus that to alter the value of the parameter capacity/unit area of separator surface, while keeping the separator interior completely filled with an electrode which can be fully discharged so as to maintain optimum mass- and volumetric energy density, it is necessary to alter the diameter of the separator tube. However, substantial expense is involved in tooling up to make tubes of the type in question, involving the use e.g. of stainless steel precision-made mandrels and matching membranes for isostatic pressing of tubes on to the mandrels. The expense of altering tube diameter is often prohibitive and severely restricts design flexibility with regard to varying the value of the parameter capacity/unit area of separator surface, while maintaining efficient mass- and volumetric energy density. Such variation is however desirable for various different cell applications.

The present invention has as an object the alleviation of the abovementioned problem of design inflexibility. The invention also provides other advantages compared with the prior art, which emerge from the description of the invention set forth hereunder.

According to the invention there is provided a high temperature rechargeable electrochemical power storage cell which has an alkali metal anode which is molten at the cell operating temperature and which is separated by a separator which is a solid electrolyte conductor of ions of the anode metal from a cathode which comprises an electronically conductive electrolyte-permeable porous matrix which is impregnated with a liquid electrolyte comprising cations of the alkali metal of the anode and halide anions, an electrochemically active cathode substance being dispersed in the porous interior of the matrix and the liquid electrolyte.. being selected so that the active cathode material is substantially insoluble therein, the separator being in the form of a sheet, the matrix of the cathode being of substantially the same peripheral outline as the separator and being opposed to the separator, in register therewith and face-to-face therewith, the separator and cathode being located in a cell housing which is divided by the separator into an anode compartment which contains the anode, and a cathode compartment which contains the cathode and electrolyte.

The separator and the matrix may each be in the form of a substantially flat plate or panel, each having a pair of parallel, spaced, flat, oppositely outwardly facing major faces and a minor edge face or faces interconnecting the major faces. While the separator may in principle be a flexible panel, both the separator and matrix will usually be in the form of stiff or rigid plates. While the plates may be circular in outline, they are preferably such as to permit close packing [in a hexagonal or square packing arrangement] of the plates and hence cells having the same outline in end view as the plates, in side-by-side relationship. Thus the plates may be square, rectangular, triangular or hexagonal in outline. Thus, in a particular embodiment, the separator and matrix may each be of a flattened shape, each having a pair of spaced oppositely outwardly facing major faces interconnected along their peripheries by one or more edge faces, the housing being prismatic in shape and having a peripheral outline in end elevation with the same shape as that of the separator and matrix, said outline of the housing permitting close packing of a plurality of like cells in side-by-side fashion.

As is usual in the art, the separator plate will be as thin as practicable consistent with mechanical strength and durability. Typically, the matrix plate will also be thin, being at most 20 mm in thickness, preferably less than 3 mm in thickness for high power applications.

In a simple cell arrangement according to the present invention, the separator and matrix plates will be located in a cell housing having a cross-section corresponding to the outline of the plates, the plates being in face-to-face relationship, and in spaced [preferably closely] or optionally abutting relationship, the matrix being located in the cathode compartment in the housing and being immersed in the same liquid electrolyte as impregnates the matrix, the anode compartment being provided in the housing on the side of the separator opposite the matrix and containing the molten alkali metal of the anode. Such cells can be arranged end-to-end in a common housing, adjacent cells being separated from each other by partitions in the housing which separate and insulate the cells from one another.

Accordingly, the cell of the invention may form part of a battery of cells stacked face-to-face with each other in a common housing.

Suitable cathodes for the cells of the present invention and methods of making them i.e. those comprising an electronically conductive matrix having an electrochemically active cathode substance dispersed therein and impregnated with liquid electrolyte are described e.g. in U.S. Pat. Nos. 4,546,055, 4,529,676, 4,560,627, 4,592,969, 4,626,483, 4,722,875 and 4,772,449, and in published British Patent Applications Nos. 2191332A, 2193837A and 2195329A. These prior art references also describe suitable separators and molten alkali metal anodes.

In particular the cathode matrix may be of a transition metal such as porous iron, nickel, chromium, cobalt or manganese, and the active cathode substance may be $FeCl_2$, $NiCl_2$, $CrCl_2$, $CoCl_2$ or $MnCl_2$. The alkali metal of the anode is preferably sodium, the separator being beta-alumina, in particular beta''—alumina or nasicon. Instead alkali metal ion-conducting polymeric membranes may be used as flexible panel separators selected to conduct the alkali metal of the anode.

As the liquid electrolyte, an electrolyte of the type $MAlHal_4$, in which M is an alkali metal and Hal is a halogen will usually be used, e.g. $NaAlCl_4$. In these electrolytes the molar proportion of Al ions should not exceed the molar proportion of alkali metal ions, i.e. the molar ratio of Al:M should not be greater than 1.1. This can be achieved by ensuring that the cathode compartment contains a proportion of solid alkali metal halide [MHal] in contact with the liquid electrolyte during all states of charge of the cell.

With regard to electrolytes of the $MAlHal_4$ type, such as $NaAlCl_4$, in which the Al:M molar ratio is not more than 1:1, it is a particular advantage that, in addition to providing for substantial insolubility therein of active cathode substances such as $FeCl_2$, $NiCl_2$, $CrCl_2$, $CoCl_2$ or $MnCl_2$ when the Al:M ratio is 1:1, such electrolytes also exhibit their minimum vapour pressure [which is substantially less than that of sulphur/sodium sulphide/polysulphide] when said Al:M ratio is 1:1, at the cell operating temperatures typically encountered. This is important from a constructional and safety point of view, as flat, thin plates of e.g. beta''-alumina can be brittle and prone to damage by high electrolyte vapour pressures, particularly during temperature excursions caused e.g. by cell malfunctions. Furthermore, such electrolytes exhibit relatively gentle freeze/thaw stresses on the separator plates; and a further feature of such electrolytes is that the alkali metal and electrolyte react, in the event of separator failure, to form solid reaction products at the temperatures in question, e.g. metallic Al and solid NaCl when Na reacts with $NaAlCl_4$ in which the Al:Na mole ratio is 1:1. All these features permit a plurality and indeed a multiplicity of cells of the present invention to be arranged in batteries in which they are stacked face-to-face, employing relatively thin separator plates with acceptable durability and resistance to separator failure, and acceptable safety, even in the event of separator failure.

Naturally, other suitable liquid electrolytes, e.g. other molten salt electrolytes may be employed, provided they contain cations of the alkali metal of the anode. Suitable electrolytes will usually contain halide anions such as chloride anions, being both chemically and electrochemically compatible with the separator and cathode and being incapable of poisoning the separator or of dissolving the active cathode substance, as such active cathode substances, when in solution in the electrolyte, are usually capable of poisoning the separator.

In the various patents and patent applications mentioned above, various options are described regarding the microstructure and electrochemical properties of the various features of the cells of the present invention. Thus U.S. Pat. No. 4,546,055 describes the basic cell from which the present invention is derived; U.S. Pat. No. 4,529,676 describes a method of making suitable cathodes for the cell of the present invention from a transition metal-containing matrix and the alkali metal halide discharge reaction product of the cathode, and it describes the possibility of using one or more intermediate refractory hard metal compounds of Fe, Ni, Co, Cr and Mn with at least one non-metal selected from the group comprising carbon, silicon, boron, nitrogen and phosphorous as the active cathode substance in its discharges state, the refractory hard metal compound being halogenated during charging by chlorination; U.S. Pat. No. 4,560,627 describes the use of $Co/CoCl_2$ or $Ni/NiCl_2$ as a cathode substance in parallel with a $Fe/Cl_2$ cathode to protect the $Fe/FeCl_2$ cathode from overcharging; U.S. Pat. No. 4,592,969 describes the use of fluoride anions as a dopant in an $NaAlCl_4$ electrolyte to resist progressive internal resistance rise of the cell with sustained cycling believed to arise from poisoning of a beta-alumina separator by $AlCl_3$ in the electrolyte; U.S. Pat. No. 4,626,483 describes the use of chalcogens such as S or Se as dopants in the liquid electrolyte and/or active cathode substance to resist progressive reduction in cathode capacity with sustained cycling, for $Ni/NiCl_2$ cathodes; U.S. Pat. No. 4,722,875 described a method of making cathodes for cells according to the present invention from discharge reaction products of the cathode in particulate form with electrolyte; U.S. Pat. No. 4,772,449 describes a method of making a cathode suitable for the cells of the present invention by making a transition metal [Fe, Ni, Cr, Co or Mn] cathode matrix with sodium chloride dispersed therein by oxidizing the metal in particulate form followed by reduction thereof; published British Patent Application No. 2191332A describes a method of making cathodes suitable for cells of the present invention by charging a cathode precursor comprising alkali metal aluminium halide molten salt electrolyte, alkali metal halide, aluminium and transition metal [Fe, Ni, Cr, Co or Mn]; published British Patent Application No. 2193837A describes using magnesium dissolved in a sodium anode suitable for the cell of the present invention, when used with a beta-alumina separator, the magnesium acting as a getter for dissolved impurities in the sodium which can accumulate at the sodium/separator interface; and published British Patent Application No. 2195329A describes doping the surface exposed to the alkali metal of the anode of a ceramic solid-electrolyte separator with a transition metal oxide to improve the wettability of the separator surface by molten anode alkali metal.

In a particular embodiment of the invention the alkali metal anode may be a sodium anode, the separator being $\beta$- or $\beta''$-alumina and the active cathode substance in the charged state of the cell being a member of the group consisting of $FeCl_2$, $NiCl_2$, $CrCl_2$, $CoCl_2$, $MnCl_2$ and mixtures of at least two thereof, the electrolyte comprising a sodium aluminium chloride molten salt electrolyte which, in the fully charged state of the cell has a molar ratio of Al:Na which is at most 1:1.

It will accordingly be appreciated that, as far as the microstructure and electrochemical properties of the various features [anodes, separators, cathodes, etc] of the cells of the present invention are concerned, and methods of making them, a large number of combinations and possibilities are available; as described, for example, in the abovementioned prior patents and patent applications; and combinations of these various options may be employed, where desirable and compatible. However, in each case, the improvement of the present invention constituted by the flat plate separator and matrix of the present invention described above can provide material advantages, as described hereunder.

The separator sheet may have major faces which are textured to have surface irregularities which increase the area of said major faces relative to flat major faces of the same outline. Such texturing may be provided by surface irregularities such as dimples, bosses or, in particular, ribs, grooves, corrugations or serrations.

The housing may have flexible walls which can flex during cell charge/discharge cycling in response to changes in the volume of the anode and cathode associated with said cycling. Instead or in addition, the anode compartment and cathode compartment may each contain an inert gas space whose volume can change during cell charge/discharge cycling in response to changes in the volume of the anode and cathode associated with said cycling.

The invention will now be described, by way of example, with reference to the accompanying diagrammatic drawings, in which.

In each of the Figures of the drawings a cell is designated 10, and is shown comprising a molten alkali metal anode 12 e.g. of sodium; a solid electrolyte separator 14 e.g. of beta"-alumina; and a cathode 16 e.g. of a porous iron matrix having, in its charged state, $FeCl_2$ dispersed therein and a $NaAlCl_4$ molten salt liquid electrolyte impregnated therein. In the charged state of the cell the molten salt electrolyte will comprise substantially stoichiometric $NaAlCl_4$ in which the Na:Al mole ratio is substantially 1:1 but not less than 1:1, and a small proportion of solid Na Cl will be dispersed in the matrix. The cells each have housing 18 provided with anode and cathode terminals [not shown] connected electronically to the sodium of the anode and cathode matrix respectively. The matrix is in contact with the separator in each case and the cells are shown in their fully charged state with the sodium substantially filling its associated anode compartment.

Figure 1A:
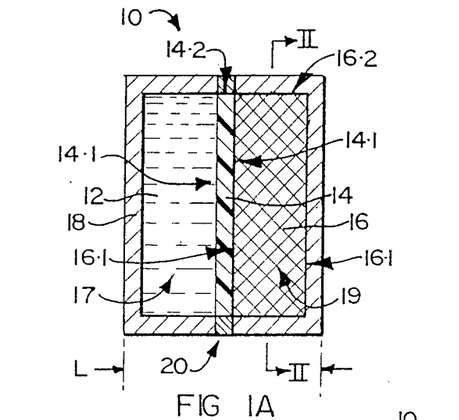
FIGS. 1A–1C show schematic sectional side elevations of cells according to the present invention, taken e.g. in the direction of line I—I in FIG. 2.
Figure 1B:
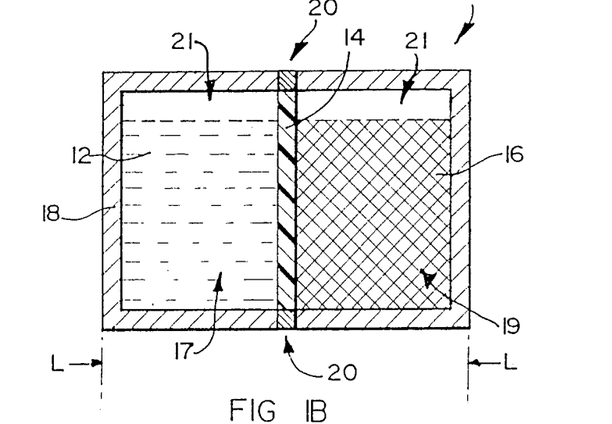
Figure 1C:
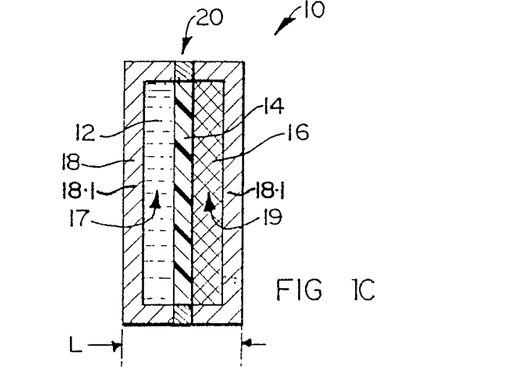
Figures 2A, 2B, 2C, 2D:
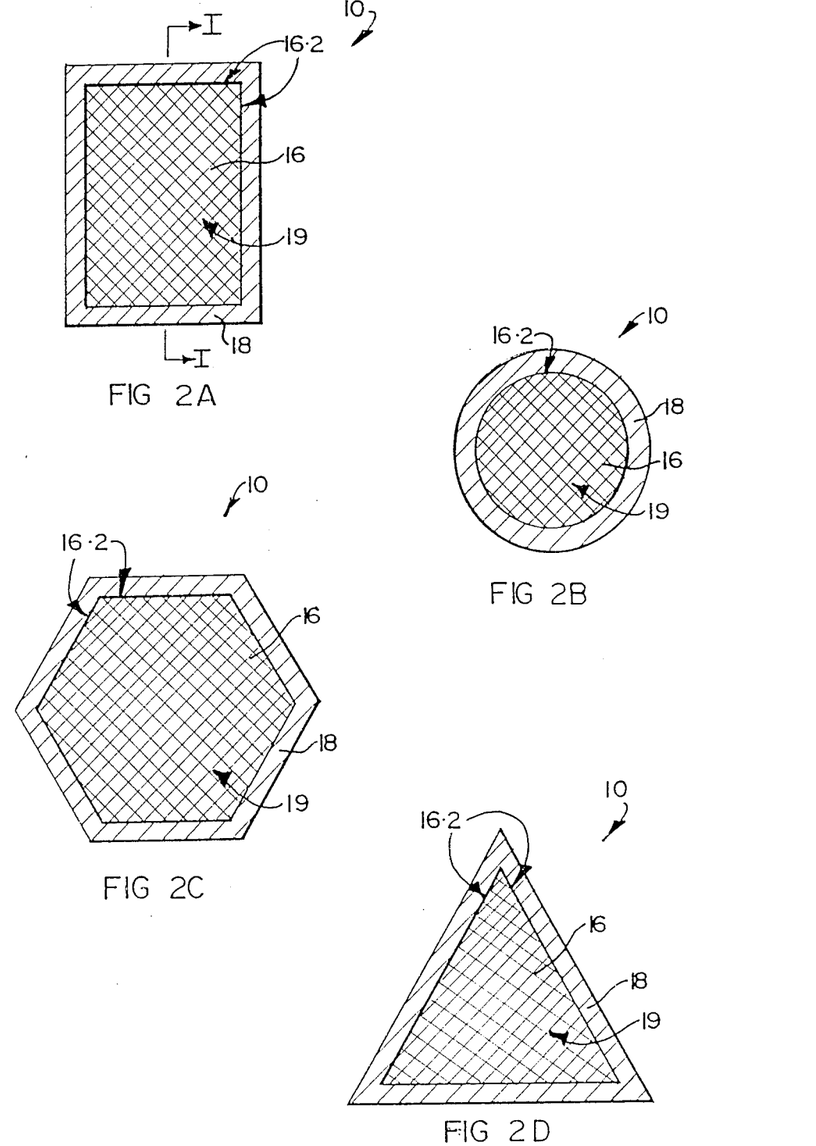
FIG. 2A–2F show schematic sectional end elevations of cells according to the invention in the direction of line II—II in FIG. 1.
Figures 2E, 2F, 3A, 3B:
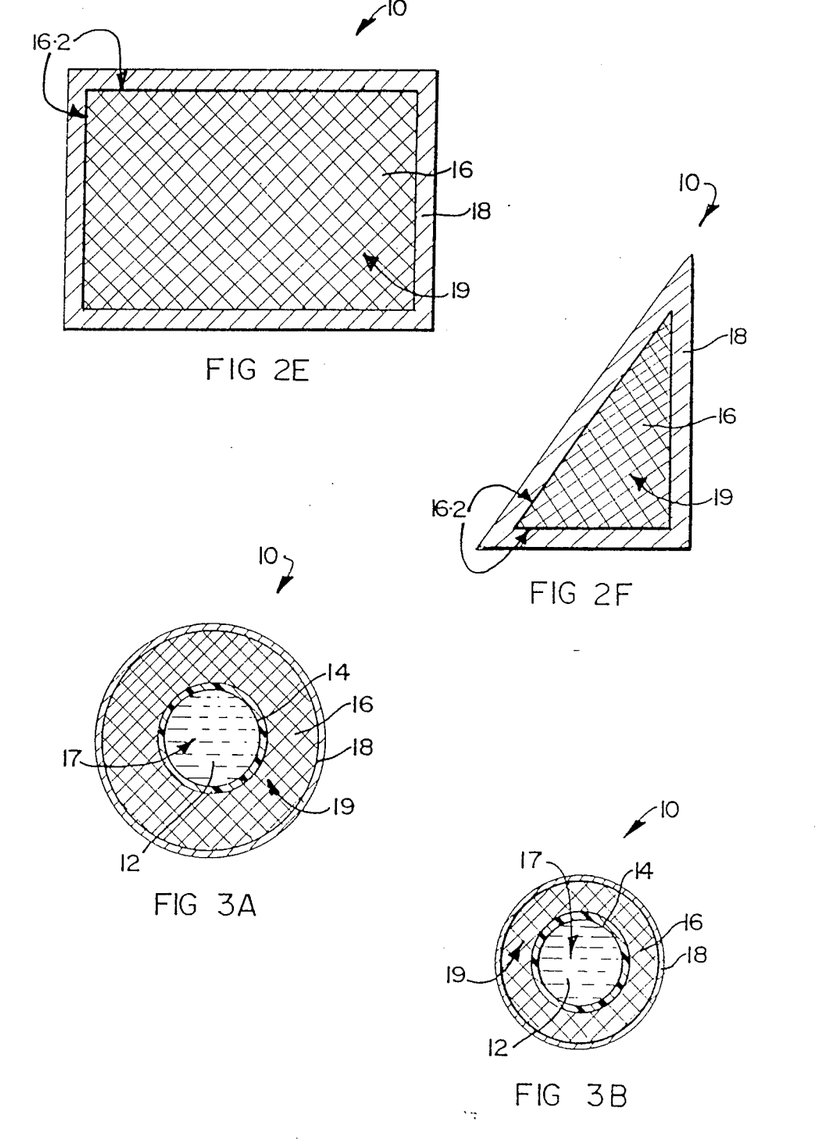
FIGS. 3A–3B show schematic cross-sections of prior art cells.

In FIGS. 1 and 2 the housing is divided by the separator into an anode compartment 17 containing the sodium and a cathode compartment 19 containing the cathode. The housing 18 is mild steel and the part of the housing in contact with the anode is electronically insulated from the part of the housing in contact with the cathode, e.g. by insulating material at 20. Provision will usually be made, e.g. by having flexible housing walls [see e.g. at 18.1 in FIG. 1C] or inert gas spaces [see 21 in dotted lines in FIG. 1B] in the anode and cathode compartments, for changes in the anode and cathode volume during charging and discharging.

In FIGS. 1 and 2 the separator 14 is in the form of a flat plate, as is the cathode matrix, which fills the cathode compartment. In FIGS. 1A and 1C the flat plate nature of the cathode matrix is most apparent, as in FIG. 1B the matrix is of substantial thickness, and is more in the nature of a block or cylinder [see FIG. 2B] or prism [see FIGS. 2A and 2C–2F]. The anode compartment filled by the molten anode 12, is of substantially the same shape as the cathode 16, having the same cross-section [see FIG. 2]. As indicated in FIG. 1, the separator 14 has a pair of oppositely outwardly facing flat smooth planar major faces 14.1; and the cathode matrix 16 has a pair of oppositely outwardly facing flat major faces 16.1. When the cell is cylindrical [see FIG. 2B as described hereunder] the separator and matrix have single cylindrical edge faces 14.2 and 16.2 respectively; and when the cell is prismatic [FIGS. 2A, 2C and 2D] there are several said edge faces 14.2, 16.2, which are rectangular.

In this regard it will be appreciated that FIG. 2 shows various possibilities for the cross-section or sectional end elevation for the cells of FIG. 1; and FIG. 1 in turn shows various side elevations for the cells of FIG. 2. In FIGS. 1A–1C different thicknesses for the cathode 16 and anode 12, in a direction normal to the major surfaces of the separator 14, sodium, the separator being beta-alumina, in particular beta'—alumina are shown, the anode and cathode of FIG. 1A being of medium thickness whereas those of FIG. 1B being relatively thick and those of FIG. 1C being relatively thin. In FIG. 2 various cross-sections are shown, namely circular [FIG. 2A]; square [FIG. 2B]; hexagonal [FIG. 2C]; equilateral-triangular [FIG. 2D]; elongate rectangular [FIG. 2E] and triangular [FIG. 2F]. The cross-sections of FIGS. 2B–2F permit cells to be close-packed, side-by-side, with either a rectangular or hexagonal packing arrangement, as the case may be.

In contrast in the prior art cells of FIG. 3, the separators 14 are tubular and the housing 18 is cylindrical, the cathode 16 being tubular and annular in cross-section, and the central anode being in a cylindrical compartment.

An important feature or parameter of cells of the type in question, is the relationship between the separator surface area exposed to the cathode, and the thickness of the cathode, in a direction normal to said separator surface. This is directly related to the parameter of capacity/separator surface area, which can be expressed as $Ah/cm^2$, as cathode volume is directly proportional to cell capacity when the cell is cathode limited [which is often the case] as regards capacity, and cathode volume is directly related [although not necessarily proportionately] to cathode thickness in a direction normal to the separator surface.

When said relationship $Ah/cm^2$ is low, the cell is capable of rapid discharge at high current densities $[mA/cm^2]$ through the separator over the whole charge/discharge cycle. When the relationship $Ah/cm^2$ is high, the cell will discharge more slowly and there will be lower current densities through the separator. Cell internal resistance, cell efficiency and cell life are also affected by the relationship $Ah/cm^2$. It is accordingly desirable to be able to vary the relationship $Ah/cm^2$ depending on the use to which a particular cell is to be put. It is also desirable to employ standardization and mass production techniques in the manufacture of various cells having different values for $Ah/cm^2$ With reference to FIG. 3, it will be appreciated that prior art standardization and mass production techniques rely, inter alia, on the mass production of separator tubes 14. These are typically pressed on to mandrels in the green state in a mould, removed from the mandrels and fired. Altering the diameter of a tube 14 thus includes re-tooling with different mandrels and to produce a series of sizes and involves high equipment costs, with a different mandrel for each size.

Furthermore, importantly, for cells as shown in FIG. 3, there is only one value (or a limited range of values) of $Ah/cm^2$ which is energy efficient for a particular diameter of separator tube 14 and for a particular type of cathode material, i.e. that value for $Ah/cm^2$ where the interior of the tube is substantially completely filled with sodium 12 in the charged state and the cathode has a radial thickness which gives it a cathode capacity which matches the anode capacity. The value of $Ah/cm^2$ cannot be increased in any way [as the anode cannot be increased in size] and can only be decreased inefficiently, as a decrease of the radial thickness of the cathode involves a reduction of the amount of sodium in the anode, if wasted sodium amounting to dead weight in the anode is to be avoided. A penalty must thus be paid in terms of wasted anode compartment space, which is only partly filled with sodium, if the sodium is reduced. Poor values for mass energy density [Ah/kg] or volumetric energy density [$Ah/m^3$] or both, are thus inevitable, if any reduction in cell capacity takes place below the optimum value for a particular tube diameter, and capacity cannot be increased above the optimum value at all.

The same general considerations apply when the cathode 16 is inside the tube 14 and the anode 12 is outside the tube 14.

Furthermore, if the cathode capacity and thickness is reduced, it is desirable to reduce the diameter of the housing 18, if further mass energy density and/or volumetric energy density penalties are to be avoided. This gives substantial loss of design flexibility for varying, in an efficient fashion, said $Ah/cm^2$ parameter. If $Ah/cm^2$ is to be varied without loss of efficiency, large ranges of diameters for the tube 14 and for the housing 18 are required, leading to inefficiency in production with high tooling costs and loss of the advantages of scale in mass production.

In contrast, with cells according to the present invention as shown in FIGS. 1 and 2, this problem is avoided. In cells of the present invention, the flat plate design enables cathode capacity/unit area of separator surface to be changed easily by the simple expedient of changing the thickness of the cathode. The same degree of flexibility does not exist in the prior art cell design discussed above, in which the separator and cathode are cylindrical or annular.

Thus, in the cells of FIGS. 1 and 2, housings 18 can be made of a particular fixed cross-sectional outline [see FIG. 2] of cylindrical or prismatic shape, and of varying length [see FIG. 1]. Separators 14 and cathodes 16 can be mass produced in flat plate form, the separators being made of a fixed outline corresponding to the cell cross-section as shown in FIG. 2, of a single thickness; and the cathodes 16 can similarly be made of said fixed outline but of a varying range of thicknesses.

This means that, for a particular cell cross-section, cell capacity and the parameter $Ah/cm^2$ can readily be varied, simply by altering housing length L and cathode thickness. In each case the various different cells can be manufactured efficiently and can be made with efficient volumetric energy density and efficient mass energy density, with the anode compartment and cathode compartment substantially completely filled by the active anode material and cathode respectively.

Furthermore, with cell cross-sections as shown in FIGS. 2A–2F, cell close packing can easily be achieved.

Inexpensive, efficient mass production is thus promoted, for a particular cell outline, with substantial design flexibility as regards cell capacity and $Ah/cm^2$ parameters, without any penalty in cell mass or volumetric energy density. A single outline or a limited range of outlines can thus cater for a substantial number of applications.

Figure 4:
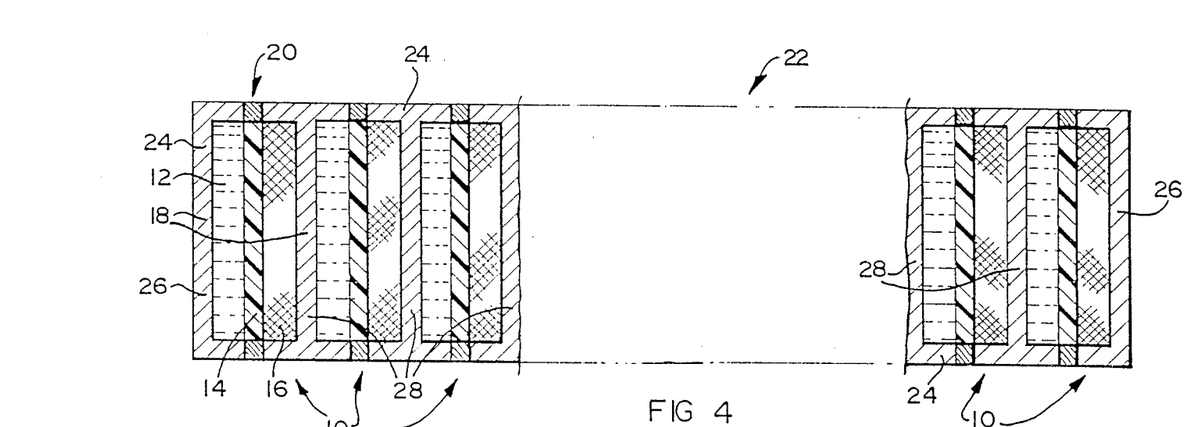
FIG. 4 shows a view, corresponding to FIG. 1C, of a battery of cells of FIG. 1C arranged face-to-face in series.

Turning now to FIG. 4, reference numeral 22 generally designates a battery of cells 10 of the type shown in FIG. 1C. The cells 10 are shown arranged face-to-face in series and the same reference numerals are used for the same parts as in FIG. 1C. The housings 18 are provided by a common elongated box structure 24 having end walls and partitions, designated respectively 26 and 28, which form the major walls of each cell housing 18.

Figure 5:
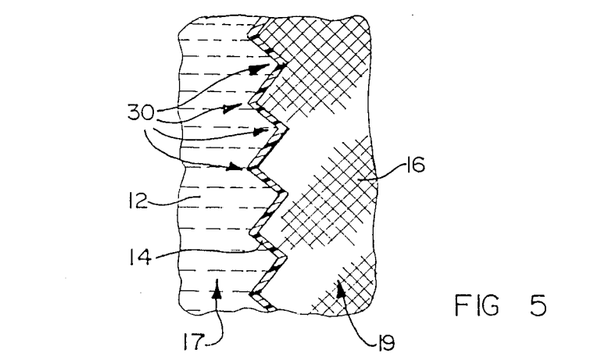
FIG. 5 shows a detail of a different embodiment of the separator of FIG. 1C.

Finally, FIG. 5 shows a detail of a portion of an alternative construction for the separator plate 24, the anode and cathode again being designated respectively 14 and 16. In contrast with FIG. 1C, which shows a substantially flat planar separator 14 with flat major surfaces, the separator 14 of FIG. 5, while still flat and planar in overall shape, is textured in that it has grooved or corrugated major surfaces, provided with corrugations 30. These corrugations 30 are shown in FIG. 4 as peaks and valleys by way of example, and it will be appreciated that they materially increase the effective surface area of the major faces of separator 14, exposed respectively to the anode 12 and cathode 26, providing for increased charge/discharge rates relative to the flat surface of FIG. 1C. Naturally the peaks and valleys of the ridges/grooves or corrugations shown in FIG. 5 are merely an example, and it will be appreciated that any surface irregularities, such as dimples, bosses, ribs or the like, which increase the effective area of the major surfaces of the separator 14, can have the same effect of increasing charge/discharge rates.

We claim:

1. A high temperature rechargeable electrochemical power storage cell which has an alkali metal anode which is molten at the cell operating temperature and which is separated by a separator which is a solid electrolyte conductor of ions of the anode metal from a cathode which comprises an electronically conductive electrolyte-permeable porous matrix which is impregnated with a liquid electrolyte comprising cations of the alkali metal of the anode and halide anions, an electrochemically active cathode substance being dispersed in the porous interior of the matrix and the liquid electrolyte being selected so that the active cathode material is substantially insoluble therein, and the separator being in the form of a sheet, the matrix of the cathode being of substantially the same peripheral outline as the separator and being opposed to the separator, in register therewith and face-to-face therewith, the separator and cathode being located in a cell housing which is divided by the separator into an anode compartment which contains the cathode and electrolyte, the cell comprising the improvement whereby, in combination:

the separator and matrix are each of flattened shape, each having a pair of spaced oppositely outwardly facing major faces interconnected along their peripheries by a plurality of edge faces, the separator and matrix each having a thickness less than half the minimum diametrical width of their major faces and the housing being prismatic in shape and having a peripheral outline in end elevation with the same shape as that of the separator and matrix, said outline being regular polygonal in shape to permit close packing of a plurality of like cells in side-by-side fashion;

the alkali metal anode is a sodium anode, the separator being $\beta$- or $\beta''$-alumina and the active cathode substance in the charged state of the cell being as member of the group consisting of $FeCl_2$, $NiCl_2$, $CrCl_2$, $CoCl_2$, $MnCl_2$ and mixtures of at least two thereof, the electrolyte comprising a sodium aluminum chloride molten salt electrolyte which, in the fully charged state of the cell has a molar ration of Al:Na which is at most 1:1;

the separator sheet has major faces which are textured to have surfaced irregularities which increase the area of said major faces relative to flat major faces of the same outline;

the housing has flexible walls which can flex during cell charge/discharge cycling in response to changes in the volume of the anode and cathode associated with said cycling; and the anode compartment and cathode compartment each contain an inert gas space whose volume can change during cell charge/discharge cycling in response to changes in the volume of the anode and cathode associated with said cycling.

2. A cell as claimed in claim 1, which forms part of a battery of cells stacked face-to-face with each other in a common housing.

* * * * *

UNITED STATES PATENT AND TRADEMARK OFFICE
CERTIFICATE OF CORRECTION

PATENT NO. : 4,975,344
DATED : December 4, 1990
INVENTOR(S) : Roger J. Wedlake and Johan Coetzer It is certified that error appears in the above-indentified patent and that said Letters Patent is hereby corrected as shown below:

In claim 1, at column 9, line 6, insert --anode, and a cathode compartment which contains the-- before "cathode".

In claim 1, at column 9, line 22, substitute --a-- for "as".

In claim 1, at column 10, line 4, substitute --ratio-- for "ration".

Signed and Sealed this

Third Day of August, 1993

Attest:

MICHAEL K. KIRK

Attesting Officer

Acting Commissioner of Patents and Trademarks